Dec. 5, 1967  C. J. SULEWSKI ET AL  3,356,781
METHOD OF TRANSFER MOLDING
Filed Oct. 3, 1963
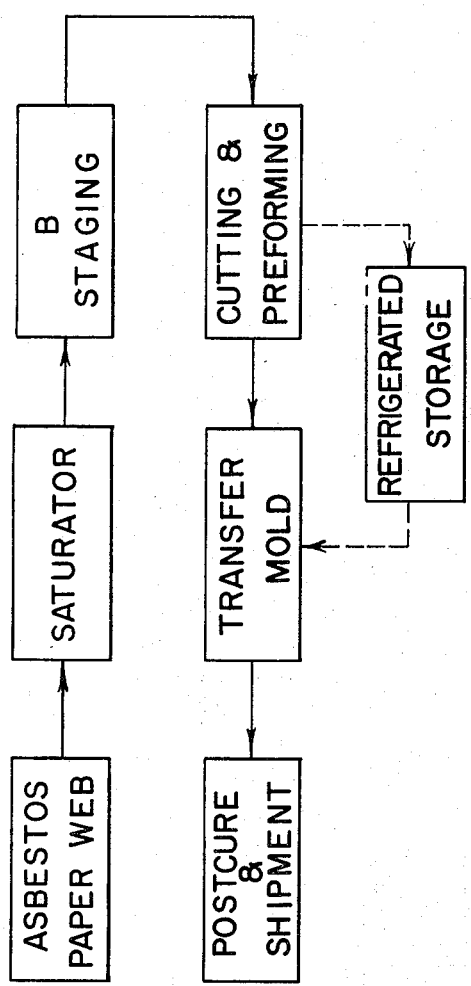
INVENTOR.
CHESTER J. SULEWSKI
JOHN G. HEDIN
BY
ATTORNEY

United States Patent Office 3,356,781
Patented Dec. 5, 1967

3,356,781
METHOD OF TRANSFER MOLDING
Chester J. Sulewski, Metuchen, and John G. Hedin, Somerville, N.J., assignors to Johns-Manville Corporation, New York, N.Y., a corporation of New York
Filed Oct. 3, 1963, Ser. No. 313,491
8 Claims. (Cl. 264—137)

This invention relates to transfer and plunger molding, and to the production of transfer molded and plunger molded thermosetting plastic articles. More particularly, it relates to new transfer and plunger molding techniques for improving the physical form of the materials and process operations used in the manufacture of fiber-reinforced thermosetting plastic pipe fittings and parts, and is primarily applicable to the manufacture of large plastic pipe fittings and parts which have necessitated the use of multiple compound preforms. While having this particular application, the invention may likewise be used for molding other articles.

In pipe and pipe fitting applications, iron, steel, copper, and other metals often do not possess desired degrees of corrosion resistance. Commonly, these materials possess excessive weight for many applications and are generally objectionable from the standpoint of being relatively expensive and lacking of quality control in large sizes.

Numerous attempts have been made to produce pipes and pipe fittings from substitute materials which will be more corrosion resistant, lighter in weight and, at the same time, competitive from the standpoint of cost and quality. Various materials, including well-known thermoplastic and thermosetting materials, incorporating various types of reinforcing materials, have been used for producing pipe, pipe fittings, and pipe fitting parts, hereinafter generically referred to as "parts," by various procedures such as molding, extrusion, and casting.

The molding of plastic parts is accomplished by four different techniques: injection molding, primarily used with thermoplastic materials; wrapping or winding techniques followed by molding; compression molding; and transfer or plunger molding.

Generally, injection molding is not used for the formation of thermosetting plastic pipe fittings and parts because the thermosetting nature of the resin fouls the molding apparatus. The wrapping technique, while permitting precision parts, is the least popular because of the expense involved in providing and using the wrapping material such as resin-impregnated glass cloth. This technique has an additional disadvantage in that the fittings do not have the same physical make-up as the pipe sections. Compression molding likewise has disadvantages because of the difficulty in positioning cores and has proven impractical where quality of precision is required.

These procedures have been objectionable for several additional reasons. Primarily, the method of forming parts by wrapping the impregnated web into proper shape and then subjecting the formed structure to polymerization consumes considerable time, i.e., several hours to several days, in order to bring about the complete polymerization of the bonding material and formation of the final structure. Secondly, the cast or extruded plastic material parts have been found unsatisfactory for applications which require quality of precision and demand parts that can uniformly withstand substantial internal pressures. The parts produced by such methods exhibit variations in structural and stress characteristics due to the formation of voids between separate layers of the laminated product caused by the migration of the webs, incomplete polymerization of the impregnating material, or the formation of by-products during polymerization. It must be emphasized that these defects are particularly acute in the case of parts such as T's, elbows, couplings, sleeves, caps, plugs, and various valves and shutoffs, so much so that quality control in mass production of these products is in some cases almost non-existent.

Thus of the four techniques, transfer and plunger molding, which may be considered similar in technique to injection molding, have proven the most useful and have been primarily used for thermosetting resin materials. Those skilled in the art will appreciate the subtle difference between transfer molding and plunger molding as involving a form-receiving receptacle placed above and to the side, respectively, but as used herein and in the accompanying claims, the term "transfer molding" will include both transfer and plunger molding techniques. This technique provides a separate receptacle or pot from which the thermosetting resin is transferred through a gate to a fixed mold cavity, and from which the cured resin may be removed after each molding step.

To produce reinforced plastic parts, this technique involves saturating a base fibrous mat or web of discontinuous fibers with the thermosetting resin, preheating the saturated mat to the B stage, and then winding the mat in a roll form. Heretofore it has been believed necessary to macerate or dice the rolled form, and then to cold press the particles, so as to reduce the bulk factor, into small capsule preforms of uniform density in order to insure uniform preheating and controlled mobility of the molding compound from the receptacle through the gate into the mold cavity. It was theorized that the particle size of the preform was responsible for the controlled mobility.

The fabrication of a preform has proven to have certain disadvantages however. Certain resin systems, for example, epoxies, cannot withstand the additional heat generated in the aforementioned processes without altering their molding characteristics. The additional heat history acquired by such compounds in size reduction and performing tends to reduce the already limited shelf life of such resin systems. This has also increased the requirements of heat and pressure needed in the molding operation. In some instances the additional heat is sufficient to bring about resin gelation, making the compound unsuitable for subsequent molding operations.

A great many attempts have been made to modify the procedures in efforts to eliminate the above defects. For example, it has been proposed to utilize impregnating materials which are designed to reduce the time required for polymerization and to reduce or eliminate any by-products in the polymerizing system. Most improvements to date, however, have still not provided a manufacturing procedure which produces consistently satisfactory pipe fitting parts at a rate which is rapid enough to provide products which are competitive with metal parts of comparable properties. Accordingly, the industry still is seeking a satisfactory method for fabricating reinforced plastic articles and pipe parts.

It is therefore a principal object of this invention to provide an improved method of making plastic pipe fittings and parts.

It is another object of this invention to provide a process for the formation of impregnated and reinforced fibrous web plastic pipe fitting parts which makes possible the production of such parts, even in very large sizes, in a relatively short period of time and avoiding undue heat history for the resin.

It is an additional object of this invention to provide improved techniques in the manufacture of reinforced plastic pipe parts which limits the heat exposure of intermediate products and extends the shelf-life of the molding compound.

It is still a further object of this invention to provide a new procedure for manufacturing pipe fittings and parts which substantially completely eliminates the formation of voids or other defective sections therein.

It is a further object of this invention to provide a suitable transfer molding technique for thermosetting plastic pipe parts to produce parts of the same make-up as the individual pipe sections to thereby insure completely uniform thermosetting resin pipe systems.

It is another object of this invention to provide an improved method of making plastic pipe parts by transfer molding following impregnating a fibrous web with a resinous substance and wrapping the impregnated web about a suitable shaped mandrel.

The foregoing objects are accomplished according to the present invention by a process which, briefly described, comprises impregnating and desirably saturating a web of fibrous material, particularly a web of asbestos paper, with a liquid composition containing a resinous condensation or addition product which is capable of polymerizing in several stages to an infusible solid state, and partly curing or B staging the resinous material with which the asbestos paper web is saturated to obtain proper compound flow. Directly thereafter, the saturated and partially cured asbestos paper web is slit and wound into predetermined roll form such that each roll form has sufficient material for one transfer molding cycle of a particular part. A removable core desirably is utilized in forming the roll form so that the core may be extracted before the roll form is molded. It has been surprisingly discovered that contrary to heretofore practiced techniques of macerating the roll and cold pressing to the capsule preform, it is possible to transfer mold the roll form directly by proper control of the molding conditions to effect mobility of the fiber-resin system. Thus, following formation of the roll segment, the thermosetting material in the wound web is directly transfer molded and polymerized to final cured condition.

The success of the present invention is due largely to the discovery that a roll form of predetermined size may be prepared directly from the saturating step since the thermosettable plastic material with which the asbestos paper web is impregnated can be accurately B-staged to a composition which can be post-treated to provide mobility of individual fibers in the total plastic system as contrasted with mobility of particle or segments of a system. Following roll formation, the roll forms may be stored under refrigeration to extend the shelf life of the compound. The roll shape of the refrigerated forms also facilitates the use of radio-frequency preheating immediately prior to molding.

The process of this invention is most advantageously utilized with resin systems possessing limited storage life or limited shelf life since it eliminates the need for time-consuming macerating, dicing, and performing operations, and thus avoids the resulting addition of heat history. In these instances, the article formed by this invention may be immediately utilized for molding without the additional size reduction and preforming operations. The roll form provides a suitable geometrical configuration for radio-frequency preheating because when placed on end, it provides a uniform cross-section for accurate control of the heating cycles. The unitary large compound mass also eliminates the need for multiple preforms and the resulting non-uniform preheat.

The molding flow of the impregnated paper and the mobility of the individual fibers in the preheated compound are adequate to allow a complete fill of the mold cavity and these factors are controlled in the paper formation and in the resin B-staging. The B-staging is adequate to prevent resin segregation during molding and the degree of B-staging required is dependent on the mold design, molding pressure, and the viscosity of the base resin.

The present invention also provides a means of processing molding materials which are too wet to undergo suitable size reduction on standard size reduction equipment. Low molecular weight epoxy and polyester resin systems do not lend themselves to maceration and dicing techniques without serious fouling of equipment and the invention described herein allows the utilization of these resin systems for transfer molding when the respective compounds are prepared by paper impregnation.

By using the present invention, it is now possible to produce fittings and parts at economic levels competitive with parts produced from resin-fiber premixes and obtain the additional benefit of strength and uniformity provided by a mat or web reinforcement.

The invention will be more fully understood and further objects and advantages thereof will become apparent when reference is made to the following detailed description and the accompanying drawing in which:

FIGURE 1 is a schematic diagram of the manufacturing steps utilized according to the present invention.

Referring to FIGURE 1 of the drawing, the basic elements of apparatus for use in the present process comprise a supply of discontinuous fiber web, such as asbestos paper, a saturator unit, a preheating or B-staging unit, a cutting and preforming device, a transfer molding device, with refrigerated storage before molding if desired, and postcuring and shipment, with suitable forwarding devices or feeding means, such as belt conveyors, connecting the several units.

The operation of making pipe fittings and parts is begun by threading a web of asbestos paper material through suitable feed rollers. The web may then be transported by traveling belt and conveyed along, in an extended position into the saturator unit where the web is impregnated or saturated, for example by immersion or spraying, with a liquid resin system capable of polymerizing to an infusible solid state. During and immediately following saturation, the liquid resin will flow out along the asbestos paper web and generally completely impregnate the web.

B-staging begins at and is controlled by the saturator unit in terms of amount of solvent employed and amount of solvent removed, together with amount of curing agent utilized, and these amounts are discussed with more particularity hereinafter and with particular reference to the specific examples. For example, an amount of asbestos paper of about 10 to 15 grams per square foot weight may be impregnated with an approximately equal amount of an epoxy resin system having up to about 60%, but preferably about 40% solvent by weight of the resin, and having about 11.0 to about 16.0 parts of curing agent per hundred parts of resin.

As the saturated web moves from the saturator, the resin system impregnant begins to undergo partial polymerization and solvent evaporation and this is accelerated as the web enters the partial curing or preheating units which may be gas fired, hot air heaters. The speed of travel of the web and the temperature of preheating, that is, within the range of about 10 to 40 ft./min. and about 150 to about 350° F., is such that the B staging is substantially complete by the time the web reaches the cutting step (from 3 to 15 min. from the saturator) where the web is divided into sections of predetermined size. The cut web sections are then wound into predetermined roll form sufficient for the part to be molded in one molding cycle. For example, a 4″ T requires 12 lbs. of material.

For the molding step, the form is simply inserted into the receptacle or pot preceding the mold which is then closed by moving a plunger into the pot under pressure, for example, from about 4,000 to about 10,000 p.s.i. and preferably from about 7,000 to about 9,000 p.s.i., the mold, and if necessary the plunger, being heated to a temperature within the range of about 225 to about 350° F., and preferably between 250 and 280° F., which will set and cure the resin during a molding cycle of about 7 to about 20 minutes. The plunger pressure against the moldable roll causes the resin and reinforcing fiber to move and eventually forces the material to take the general shape of the mold cavity. The molding operation is performed to force the roll forms into the desired shape because of the mobility of the fibers and resin, and enables maintenance of the uniform composition of the fibrous and resinous portions of the moldable roll compound by reason of the previous B-staging control. Accordingly, parts made as contemplated herein have been found to have enhanced strength and product uniformity, and are capable of being used in applications not suitable for many plastic pipe fittings and parts made from resin premix systems alone or particulate or macerated systems. It is also within the purview of this invention that a postcure be employed and this will be appreciated from the ensuing discussion and examples.

A wide variety of materials which can be polymerized to form infusible resinous solids can be utilized in the formation of the present liquid compositions for saturating the discontinous fiber web or mat. Liquid condensation products of urea-melamine and phenol-formaldehyde which can be heat cured to an infusible state were found to be particularly useful in the prior art and are also employable in the present invention. The present invention is particularly suited, however, for use of heat-convertible epoxy resins, polyester resins and improved phenol-aldehyde resins of the novolac type. In addition, mixtures of these resins with each other or with additional modifying materials, such as fillers, dyes, pigments, plasticizers, resins, catalysts, release agents, or the like, may be used.

Epoxy resins usually are prepared by etherifying a polyhydric (active hydrogen containing) phenol with an epihalohydrin such as epichlorohydrin, epibromohydrin, glycerolepibromohydrin dichlorohydrin, and the like, in conjunction with an alkali metal hydroxide. Suitable polyhydric phenols include resorcinol, hydroquinone, methyl resorcinol, chlorohydroquinone, phloroglucinol, 1,5-dihydroxynaphthalene, 4,4'-dihydroxydiphenyl, bis(4-hydroxyphenyl)methane, 1,1-bis(4-hydroxyphenyl)ethane, 1,1-bis(4-hydroxyphenyl)-isobutane, 2,2-bis(4-hydroxyphenyl) propane, 2,2-bis(4-hydroxyphenyl)-butane, 2,2-bis(4-hydroxy-2-methyl)propane, 2,4'-dihydroxydiphenyldimethylmethane, 2,2-bis(2-chloro-4-hydroxyphenyl)propane, 2,2-bis(2-hydroxynaphthyl)pentane, 1,3-bis(4-hydroxyphenyloxy)-2-hydroxypropane, 3-hydroxyphenyl salicylate, as well as more complex polyhydric phenols such as novolac resins obtainable by acid catalyzed condensation of phenol, p-cresol or other substituted phenols with aldehydes such as formaldehyde, acetaldehyde, and crotonaldehyde; condensates of phenols with cardanol condensates of phenols with aliphatic diols and condensates of phenols with unsaturated fatty oils. The polyhydric phenols contain 2 or more phenolic hydroxyl groups in the average molecule thereof and are free of other functional groups which would interfere with formation of the desired glycidyl ethers. Generally preferred are those polyhydroxy phenols containing from 6 to 30 carbon atoms.

A typical epoxy resin for use in the present invention may be produced by the reaction of one or more moles of a compound containing two or more epoxide groups such as epichlorohydrin, with a mole of an active hydrogen containing compound such as 2,2-bis(4-hydroxyphenyl)propane, known in commerce as Bisphenol A, in the presence of a base such as sodium hydroxide, sodium hydroperoxide, or potassium hydroxide, and at elevated temperatures within the approximate range of 50–150° C. The resious glycidyl polyether obtained from epichlorohydrin and Bisphenol A is a complex mixture rather than a single chemical compound, depending for the most part on the relative proportions of Bisphenol A and epichlorohydrin in the initial reaction mixture.

Epoxy resins may vary from the liquid state at ordinary room temperatures, to high molecular weight solids having melting points well above 100° C., and as described are by themselves permanently thermosetting and ordinarily require the addition of cross-linking agents or other reactive materials before they can be cured to hard, infusible resinous products. The chemical hardening agents may react with the epoxy resins at their epoxy groups or the reaction may involve the active hydrogen of the phenol hydroxyl groups, or both, and are usually added to the epoxy resin system immediately prior to use, for example, in the saturator unit.

The chemical hardening agents usually include nitrogen compounds such as a primary, secondary or tertiary aliphatic amine, including methylamine, dimethylamine, trimethylamine, 2-ethylhexylamine, stearylamine, allylamine, monoethanolamine, diethanolamine, triethanolamine, monoisopropanolamine, diisopropanolamine, triisopropanolamine, ethylenediamine, triethylenetetramine, tetraethylenepentamine, aminoethylethanolamine; aromatic amines, such as o-phenylenediamine, m-phenylenediamine, p-phenylenediamine, o-toluidine, m-toluidine, p-toluidine, benzylamine, methylaniline, diphenylamine, triphenylamine; pyridine compounds having condensed pyridine rings, and their homologs and other derivatives, for example, alpha-picoline, beta-picoline, gammapicoline, the lutidines, such as 2,6-lutidine, the collidines, 2-ethanolpyridine, 4-ethanolpyridine, 2-henxypyridine, 2-propanolpyridine, 4-propanolpyridine, 2-vinylpyridine, quinoline, isoquinoline, quinalidine, lepidine; amino-pyridines and homologs thereof, for example, 2-amino-3-methylpyridine, 2-amino-6-methylpyridine, 2-aminopyridine; cycloalkylamines, for example, cyclohexylamine, and dicyclohexylamine; piperidine, while the class of aromatic amines above is generally preferred for use in the present invention. As shown in tables and specific examples hereinafter, the amount of curing agent may be less than, equal to or greater than the stoichiometric amount, the precise amount having a determinative effect on the ultimate physical properties.

The unsaturated polyester which may be utilized in impregnating asbestos paper material according to the present invention may be prepared conveniently by esterifying a polyhydric alcohol preferably having no other reactive groups than the hydroxyl groups with a substantially molar equivalent of at least one ethylenically unsaturated dicarboxylic acid and anhydrides thereof.

The ethylenically unsaturated alpha, beta dicarboxylic acids which may be employed in accordance with this invention may contain vinyl, allyl, acrylic, methacrylic or similar reactive unsaturated groups and include maleic acid, furamic acid, monochloromaletic acid, itaconic acid, itaconic anhydride, citraconic acid, and citraconic anhydride as well as acidic esters such as diallyl phthalate glycol dimethacrylate or the like. In preparing the polyester, the unsaturated acidic component may be partly or completely replaced with one or more saturated aliphatic polycarboxylic acids and examples thereof include succinic acid, adipic acid, glutaric, azelaic sebacic acids and anhydrides thereof, as well as saturated cycloaliphatic and aromatic dicarboxylic acids such as phthalic, terephthalic, isophthalic, or with known anhydrides of any of the above or of additional acids. This latter group includes phthalic anhydride, isophthalic anhydride, as well as di-, tetra-, and hexahydrophthalic anhydride, 3,4,5, 6,7,7 - hexachloro - 3,6 - endomethylene - 1,2,4,5 - tetrahydrophthalic anhydride (chlorendic anhydride), succinic anhydride, maleic anhydride, chlorosuccinic anhydride, monochloromaleic anhydride, 6-ethyl-4-cyclohexadiene-1,2-dicarboxylic acid anhydride, 3,6-dimethyl-4-cyclohexadiene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctyl succinic anhydride, nonadecadienylsuccinic anhydride, 3-methoxy-1,2,3,6-tetrahydrophthalic acid anhydride, 3-butoxy-1,2,3,6-tetrahydrophthalic anhydride, pyromellitic anhydride, di-, tetra- and hexahydropyromellitic anhydride, polyadipic acid anhydride, polysebacic acid anhydride, and the like, and mixtures thereof.

The polyhydric alcohols which are suitable for use in preparing polyesters for this invention include those aliphatic alcohols having no other reactive groups than the hydroxyl groups. Examples of suitable alcohols include ethylene glycol, glycerol, pentaerythritol, propylene glycol, diethylene glycol, 1,5-pentanediol, and triethylene glycol, although many others are known and utilizable. Mixtures of polyhydric alcohols also may be employed and in some cases epoxides may be used in place of glycols, particularly in reaction with dicarboxylic acids instead of their anhydrides.

The polyester resins are prepared by reacting the acidic components and the polyhydric alcohol in accordance with usual esterification procedures. For example, the acidic components and the polyhydric alcohol are heated under reflux in the presence of an esterification catalyst such as hydrochloric acid, sulphuric acid, benzene sulfonic acid, or the like. Removal of water formed in the reaction to increase the degree of esterification may advantageously be effected by utilizing azeotropic distillation as, for example, by carrying out the reaction in the presence of a volatile organic liquid such as toluene, xylene, or the like.

The novolac resins employed alone or in preparing epoxy resins for this invention are well known substances, many of which are available as commercial products. As is known in the art, they are produced by condensing phenol with an aldehyde in the presence of an acid catalyst with use of a mol ratio of the phenol to aldehyde greater than about 1.1 and up to about 2.5, i.e., about 0.4 to 0.9 mol of aldehyde per mol of the phenol.

Although novolac resins from formaldehyde are generally preferred, novolac resins from any other aldehydes such as, for example, acetaldehyde, choral, butyraldehyde, furfural; can also be used. In order that the epoxy resin will have the solubility in paraffinic hydrocarbons, it is essential that the novolac resin be derived from an alkylphenol usually containing from 4 to 18 carbon atoms in the alkyl group. Although the alkyl group can be straight-chained, it is usually preferred to have novolac resin of a phenol containing a branched-chain alkyl substituent. Among representative alkylphenols from which the novolac resin is derived for use alone or in preparing suitable epoxy resins are butylphenol, tertiary butylphenol, tertiary amylphenol, hexylphenol, 2-ethylhexylphenol, diisobutylphenol (from alkylation of phenol with diisobutylene), nonylphenol, isononylphenol (from alkylation of phenol with propylene trimer), decylphenol, dodecylphenol, isododecylphenol (from alkylation of phenol with propylene tetramer or with triisobutylene), average tetradecylphenol (from alkylation of phenol with a mixture of propylene tetramer, pentamer and a silghtly higher polymer), 3-pentadecylphenol, palmitylphenol, stearylphenol, and the like. It is preferred, but not essential, that the alkyl substituent be linked to the para carbon atom of the parent phenolic nucleus. For use in preparing the epoxy resins of the invention, a novolac resin of a substance of the group consisting of p-alkylphenol, o-alkylphenol and mixtures thereof is suitable when the alkyl group contains at least 4 carbon atoms.

The crystallizable novolacs particularly useful as impregnants are the diphenylols and triphenylols. At least one of the phenolic nuclei has two active nuclear positions for cross-linking with a methylene group engendering agent and the remaining phenolic nuclei each may have one or two active nuclear positions, any substituents on phenolic nucleus usually being restricted to alkyl or chlorine.

Specific examples of crystallizable novolac type products where both phenolic nuclei each have two active positions are the 2,2'-, 2,4'- and the 4,4'- isomers of dihydroxydiphenyl methane, dihydroxydiphenyldimethylmethane, dihydroxy-diphenylethylmethyl methane, and dihydroxy-diphenylmethylmethane and the diphenylols obtained by reacting meta xylenol, meta cresol, or meta chlorophenol in large molar excess (5 or more mols) with a mol of formaldehyde or acetone.

Specific examples of crystallizable triphenylol novolacs, where all the terminal phenolic nuclei each have two active positions are 2,4-bis (4-hydroxybenzyl) phenol, 2,6-bis(4-hydroxybenzyl) phenol, and 2,6-bis(2-hydroxybenzyl) phenol.

Specific examples of crystallizable novolac type products in which one phenolic nucleus has two active positions and the remaining phenolic nuclei have only one active position are the unsymmetrical diphenylols such as are obtained by reacting a molar quantity of a methylol substituted phenol such as saligenin with usually five or more mols of a para- or ortho-alkyl or chloro substituted monohydric phenol such as ortho cresol, para tertiary butyl phenol, or ortho chlorophenol. These crystallizable unsymmetrical diphenylols include among others 2,2'-dihydroxy-3' methyldiphenyl methane, 2,2'-dihydroxy-5' methyl diphenylmethane, 2,2'-dihydroxy-3'6'-dimethyl-diphenyl methane, and 2,2'-dihydroxy-5'-tertiary butyl diphenyl methane.

The crystalline diphenylols and triphenylols as herein described can be used alone or in admixture, and in pure form or in impure mixtures containing higher molecular weight novolac type condensation products comprising essentially linear condensates of from 4 to more than 20 methylene or alkyl substituted methylene linked phenolic nuclei. These higher molecular weight condensates are normally brittle resins at room temperature but when heated sufficiently, liquefy to more or less fluid masses.

A phenolic novolac resin, preferably of the type with which the asbestos paper is impregnated, and typical of which is a resin made by reaction of phenol with an aldehyde, is mixed with a suitable epoxy type resin as discussed above which is obtained by reacting epichlorohydrin and Bisphenol A. An epoxy hardener taken from the group of amines, preferably an aromatic amine such as m-phenylenediamine, is combined with the resin mixture at the saturator in sufficient quantity to provide for B-staging and final or C-staging between individual portions of the epoxy resin. A mold release agent such as zinc stearate is desirably also added to the resin mix in the saturator bath.

In executing the process of this invention, it is desirable to have the resin system and particularly the epoxy and epoxy novolac resin system in a mobile liquid condition when the hardening agent is added in order to facilitate mixing, as well as during the saturating or impregnating step to insure complete resin integration into the asbestos paper. Epoxy resin systems utilizing monohydric phenols are known which achieve suitable fluidity while avoiding the use of solvents since the solvent may have a deleterious effect if present during final stages of curing.

While the polyester, epoxy and epoxy novolac resin systems can be utilized without solvents or diluents, it is generally desirable according to this invention to add a liquid solvent in order to achieve the desired fluidity in the saturator bath. The solvents may be volatile ones which escape by evaporation in drying towers of the saturator unit before and/or during the B-staging such as ketones like acetone, methyl ethyl ketone, methyl isobutyl ketone, isophorone; esters such as ethyl acetate, butyl acetate, ethylene glycol monoacetate, acetate of ethylene glycol monomethyl ether; chlorinated hydrocarbons such as trichloropropane, chloroform. Solvents which remain in the cured composition may also be used, such as diethyl phthalate, dibutyl phthalate, or liquid monoepoxy compounds, including glycidyl allyl ether, glycidyl phenyl ether, styrene oxide, 1,2-hexylene oxide, glycide, and the like, as well as cyano-substituted hydrocarbons, such as acetonitrile, proponitrile, adiponitrile, benzonitrile, and the like. It is also convenient to employ the solid or semisolid polyepoxies in combination with a liquid polyepoxide, such as a normally liquid glycidyl polyether of a polyhydric alcohol.

The reinforcement used consists essentially of a discontinuous inorganic fiber mat or web product, and may be illustrated by glass fiber mats and asbestos papers.

The asbestos paper that may be utilized in the present invention is ordinarily produced by suspending finely divided relatively short fibered asbestos, and in some cases in combination with other fibers or organic matter, in water. In some cases, nylon or other fibers are introduced into the suspension in order to impart strength to the paper to be laid down. Starch, or other filler such as clay and the like, is often introduced into the water in which the asbestos fibers are suspended and the suspension of asbestos fibers, with or without such additional fillers and fibers, is then poured over a screen in order to lay a paper. Upon pressing and drying, asbestos paper is produced. In some instances, the paper may be prepared by finely ball-milling or otherwise subdividing asbestos fibers into a fine fibrous form known as microfine asbestos for extremely thin paper used in making small diameter parts. Such paper in many cases averages from 1 to 5 mils in thickness as compared to 5 to 15 mils thickness and a weight of about 10 to about 15 grams per square foot for paper produced from ordinary short-fibered asbestos which has not been so finely divided. The preferred fibrous web is a blue asbestos paper having a weight of between about 10 to about 15 grams per square foot. Either product, or its equivalent, may be employed in this invention with satisfactory results.

In Table I following are given formulation and specification recipes for a typical epoxy resin utilized in Examples 1 to 3 below of the present invention:

TABLE I.—EPOXY COMPOUND FORMULATION

| Component: | Percentage parts by weight |
|---|---|
| Epoxy resin | 41.23 |
| m-Phenylenediamine (curing agent) | 5.77 |
| Asbestos paper | 53.00 |
| Total | 100.00 |

EPOXY RESIN SPECIFICATIONS REACTION PRODUCT OF EPICHLOROHYDRIN AND BISPHENOL A

| | |
|---|---|
| Viscosity | 10,000–16,000 c.p.s. |
| Specific gravity | 1.15–1.17 @ 25° C. |
| Atomic weight per epoxide unit | 185–200. |
| Stoichiometric curing agent ratio | 14 parts per hundred parts of resin. |
| Hydrolyzable chlorine | 0.1% maximum. |
| Molecular weight (approximate) | 375. |

Table II below contains typical specifications for commercially available epoxy-novolac materials employed in Example 4 to 9 following:

TABLE II.—EPOXY RESIN SPECIFICATIONS

| Properties | Example | | | | | |
|---|---|---|---|---|---|---|
| | 4 | 5 | 6 | 7 | 8 | 9 |
| | Types of epoxy resin | | | | | |
| | Ortho-Cresol-Formaldehyde Reacted with Epichlorohydrin | | | | Novolac | |
| Molecular weight (approximate) | 540 | 1,080 | 1,150 | 1,270 | 540 | 650 |
| Weight per epoxide (approximate) | 200 | 225 | 230 | 235 | 180 | 180 |
| Stoichiometric curing agent ratio | 13.5 | 12.0 | 11.7 | 11.5 | 15.0 | 15.0 |
| Softening Point (Durrans) ° C | 35 | 72 | 80 | 99 | | |
| Specify Gravity at 25° C./4° C | 1.12 | 1.16 | 1.17 | 1.19 | | 1.220 |

*Examples 1–9*

In this series of examples, a plurality of reinforced plastic parts were fabricated from webs of blue asbestos paper of 12.5 grams per square foot average weight and saturated with each of the resin systems outlined in Tables I and II in the order given in Table III, all utilizing m-phenylenediamine curing agent for comparison purposes, in parts per hundred resin set out in Table III. Fifteen parts were fabricated for each of Examples 1 to 8, but only 10 parts were fabricated for Example 9.

For these examples, an amount of resin system approximately equal to the weight of asbestos paper was employed so that the saturated webs were about double the weight of the starting paper. Percent flow of the resin out of the saturator ranged from about 5.0 to about 7.5% and residual solvent of the saturator was kept under about 0.4% B-staging, which began in the saturator, was completed with a radio frequency preheater at temperatures within the range of about 150 to about 165° F. Mold temperatures and times, as well as the postcure profiles, were varied somewhat and these conditions are outlined in Table III. Molding pressure in the mold was generally in the neighborhood of about 8000 p.s.i.

TABLE III

| Example No. | Curing Agent Ratio (phr.) | Mold Cure | | Postcure Cycle | |
|---|---|---|---|---|---|
| | | Time (min.) | Temp. (° F.) | Time (hr.) | Temp. (° F.) |
| 1 | 11 | 15 | 300 | 4 | 400 |
| 2 | 15 | 15 | 300 | 4 | 300 |
| 3 | 14 | 12 | 240 | 2 hr. at 200+ 2 hr. at 225+ 2 hr. at 260 F. | |
| 4 | 13.5 | 12 | 300 | 4 | 300 |
| 5 | 12 | 12 | 300 | 4 | 300 |
| 6 | 11.7 | 12 | 300 | 4 | 400 |
| 7 | 11.5 | 12 | 300 | 4 | 300 |
| 8 | 15 | 12 | 300 | 4 | 300 |
| 9 | 15 | 10 | 300 | 4 | 300 |

As a result of Examples 1 to 9 it has also been found according to the present invention that proper B-stage preheating of the compound prior to molding is necessary to eliminate resin segregation in the molded part since the compounds lack adequate flow to be molded without the preheating cycle. To avoid resin segregation, but maintain proper compound, it is therefore necessary to maintain accurate control of the resin B-stage as set out in the foregoing disclosure for producing the improved fittings and parts of the present invention with minimum distortion and shrinkage.

*Example 10*

A plurality of asbestos paper webs of weight ranging from 11 to 14 grams per square foot were separately saturated with epoxy resin systems of the following general formulation:

TABLE 10-1, FORMATION RECEIPE

| (1) Epoxy Saturant Formulation | Batch, lb. | Percent |
|---|---|---|
| Epoxy (resin) as per Example 1 | 100.00 | 47.93 |
| Stoichiometric amounts of m-phenylenediamine curing agent | 13.76–14.14 | 6.71 |
| Methyl ethyl ketone olvent | 93.27 | 44.70 |
| Zinc sterate (mold release agent distributed uniformly in the resin-solvent system) | 1.38 | 0.66 |
| Total | 203.65 | 100.00 |

Depending on the weight of paper being impregnated, the percent saturation thereof with resin ranged from about 47% (for minimum weight papers) to about 50% (for heaviest weight papers treated). For heavier materials, the percent residual solvent after B-staging was as high as 0.4% for heaviest weight papers and the flow of resin in the saturated paper during B-staging ranged from 5.0% for minimum weight papers to about 7.5% for heaviest weight papers treated.

Following saturation, the material was cut into about 6.5 inch lengths and about 12 lbs. in weight just sufficient for producing four-inch 90° elbows and four-inch T's, and heating to improve plasticity was continued by means of radio-frequency preheating at temperatures ranging from about 150 to about 165° F. to increase the mobility of the composition. Understandably, lengths would be somewhat greater for the production of T's than elbows. The roll forms were then placed into a pot, passed into a suitably shaped mold, and subjected to molding pressures of about 7000 to 9000 p.s.i. and heated within the range of 225 to 230° F. for a period of about 17 minutes. Following molding, the fittings were removed and subjected to a postcure treatment having the following time-temperature profile:

TABLE 10–2.—POSTCURE PROFILE

| Time, hours: | Temperature, at ° F. |
|---|---|
| 2 | 200 |
| +2 | 225 |
| +2 | 260 |
| 6 (total) | |

The four-inch 90° elbows and T's withstood pressures of 400 to 500 p.s.i.

*Example 11*

The procedure of Example 10 above was repeated but this time for the production of three-inch diameter elbows and T's utilizing saturated paper rolls of about 6½ inches in length and about 5 lbs. in weight. The compound formulation was the same, but for this example, mold clamping pressure was 8000 p.s.i. at temperatures within the range of 235 to 240° F. for a period of 15 minutes because of the smaller roll size. The same postcure profile was retained however and the resultant fittings showed comparable hydrostatic strengths to those of Example 10.

*Example 12*

The procedure of Example 10 was repeated again for the production of 1-inch diameter fittings utilizing saturated paper segments about 6½ inches in length and about 1 pound weight. For this example, the formulation was the same but mold clamping pressure was 800 p.s.i. at a molding temperature of 280° F. for a period of 13 minutes due to the smaller roll size. The postcure treatment had the following time-temperature profile:

TABLE 12–1.—POSTCURE PROFILE

| Time, hours: | Temperature, at ° F. |
|---|---|
| 2 | 200 |
| 2 | 225 |
| 2 | 260 |
| 2 | 300 |
| 8 postcure (total) | |

*Example 13*

To compare the present invention with commercially available phenolic resin fittings, the procedure of Example 10 above was essentially followed with a standard resin such as phenolic-formaldehyde with about .5 to 1 mol ratio of phenol to formaldehyde. The mold temperature was 280° F. and the postcure ran for four hours at 325° F. for producing four-inch 90° elbows.

Although some of the elbows tested were capable of 485 p.s.i., the useful hydrostatic strength for 95% of the sample fittings was 412 p.s.i.

With this invention, a process has been developed to manufacture large diameter (three and four inches and above) thermosetting resin fittings and parts which are transfer molded directly from roll segments of resin saturated asbestos paper. Thus, the macerating, dicing, and preforming operations as well as various helical and spiral wrapping techniques are eliminated from the manufacturing process. The fittings manufactured by the present process possess hydrostatic strengths comparable to equivalent phenolic fittings and thus a hitherto unattainable 100 p.s.i. fitting with an approximately 4:1 safety factor can be produced in the large diameter sizes.

It will be understood that various changes and modifications may be made in the foregoing procedure without departing from the spirit of this invention. For example, in mechanizing the processes outlined in the examples, various dipping, spraying, or immersion impregnating procedures are envisioned for use in the saturator together with the use of ordinary material feeding devices for expediting manufacture. Accordingly, the invention is to be limited only to the extent shown by the following claims, as interpreted by the specification.

What we claim is:

1. A method for making plastic pipe fittings comprising the steps of supplying a continuous web of asbestos paper to a saturating step, saturating the web with a liquid resin composition containing a curable resin selected from the group consisting of polyester, epoxy, epoxy-novolac, phenolic resins, and mixtures thereof, a curing agent for the curable resin and a solvent, removing substantially all of the solvent by heating the resin to 150 to 350° F. such that the curing agent is able to react with the resin and partially cure the resin to a B-stage to insure fiber resin mobility and integral plastic flow during transfer forming a wound roll shaped form from said saturated web, introducing the roll form into a preheated receptacle, transferring the roll form to a mold cavity by exerting pressure thereon to cause the form to take the configuration of the mold, and heating the mold to advance the curable resin to an infusible solid state.

2. The method of claim 1 wherein the curable resin is a polycarboxylic acid ester of a polyhydric alcohol.

3. The method of claim 1 wherein the curable resin is a glycidyl ether of a polyhydric phenol.

4. The method of claim 3 wherein the curable resin has a polymer molecular weight of about 180 to about 235 per epoxide unit.

5. The method of claim 1 wherein the curable resin is obtained by condensing an epihalohydrin with a polyhydric novolac resin of aldehyde and alkyl phenol.

6. The method of claim 1 wherein the curable resin is a phenol formaldehyde condensation product.

7. A method of transfer molding comprising saturating a continuous mat of discontinuous fibers with a liquid thermosetting resin, partially curing said resin to a B-stage by heating the saturated mat at a temperature to insure fiber resin mobility and integral plastic flow during transfer, cutting the mat into sections corresponding to the amount of material required for the molded article, forming the sections into wound tubular roll forms, and thereafter transfer molding under heat and pressure the roll form per se into the final article.

8. A method of producing corrosion resistant pipe fittings and parts comprising passing a continuous web of discontinuous inorganic fiber through a saturator, saturating the web with a liquid thermosetting resin capable of polymerization to an infusable solid state, subjecting the saturated web to heat to polymerize said resin to the B-stage, cutting the partially cured saturated web into sections corresponding to the amount of material necessary for the molded part, forming the sections into wound roll shaped forms, subjecting the form per se to transfer molding, and heating the molded form to complete the conversion of the resin material to an infusable state.

References Cited

UNITED STATES PATENTS

| 2,037,269 | 4/1936 | Rieser | 264—319 |
| 2,079,393 | 5/1937 | Benge | 18—42 |
| 2,129,203 | 9/1938 | Dufour | 264—25 |
| 2,130,254 | 9/1938 | Visman | 264—328 |
| 2,738,551 | 3/1956 | Howald | 264—328 |
| 2,749,266 | 6/1956 | Eldred | 264—137 |
| 2,990,583 | 7/1961 | Barbera | 264—319 |
| 3,058,165 | 10/1962 | Purvis | 264—313 |
| 3,137,670 | 6/1964 | Maneri | 260—37 |
| 3,143,519 | 8/1964 | Nitzche | 260—37 |

ROBERT F. WHITE, *Primary Examiner.*

R. B. MOFFITT, *Assistant Examiner.*

UNITED STATES PATENT OFFICE
CERTIFICATE OF CORRECTION

Patent No. 3,356,781 December 5, 1967

Chester J. Sulewski et al.

It is hereby certified that error appears in the above numbered patent requiring correction and that the said Letters Patent should read as corrected below.

Column 2, after line 59, insert the following paragraph:

It is a further object of this invention to provide pipe fittings and parts which have high structural strength and other desirable physical properties, and in which the structural and physical properties are uniform throughout the entire length of the part.

Column 6, line 22, for "2-henxypyridine" read -- 2-hexylpyridine --.

Signed and sealed this 21st day of January 1969.

(SEAL)
Attest:

Edward M. Fletcher, Jr.
Attesting Officer

EDWARD J. BRENNER
Commissioner of Patents